United States Patent Office 3,194,801
Patented July 13, 1965

3,194,801
STABLE AMINO-SUBSTITUTED LACTAMS
Melvin Perelman, Indianapolis, Ind., assignor to Eli Lilly and Company, Indianapolis, Ind., a corporation of Indiana
No Drawing. Filed Oct. 15, 1962, Ser. No. 230,697
3 Claims. (Cl. 260—239)

This invention relates to a group of novel amino-substituted lactams and to novel hydrogenation processes utilizing these lactams.

The lactams provided by this invention, which are systematically named as 2-azetidinones, can be represented by the following formula:

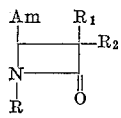

wherein Am is a member of the group consisting of di(lower-alkyl)amino, N-alkyl anilino, N-alkyl substituted-anilino, N-alkyl aralkylamino, piperidino, pyrrolidino, and morpholino; R is a member of the group consisting of phenyl and substituted phenyl; $R_1$ and $R_2$, when taken separately, represent lower alkyl groups and, when taken together with the carbon atom to which they are attached, represent a cycloalkyl group.

In the above formula, when R represents substituted phenyl, it can be for example, o-, m-, and p-tolyl, p-chlorophenyl, o-bromophenyl, m-trifluoromethylphenyl, m-xylyl, p-cumyl, p-anisyl, o-ethoxyphenyl, 3,4-methylenedioxyphenyl, o-, m-, and p-nitrophenyl, m-iodophenyl, and the like. When either $R_1$ or $R_2$ represents a lower alkyl group, it can be illustratively, methyl, ethyl, propyl, isopropyl, n-butyl, isobutyl, and the like. $R_1$ and $R_2$, when taken together with the carbon atom to which they are attached, can represent a cycloalkyl group such as cyclopentyl, cyclohexyl, cycloheptyl, and cyclo-octyl, as well as alkyl-substituted cycloalkyl groups.

Amino groups represented by Am in the above formula include, illustratively, di(lower-alkyl)amino groups such as diemthylamino, diethylamino, di-n-propylamino, N-methyl sec-butylamino, N-methyl t-butylamino, N-ethyl isopropylamino, and the like; N-lower-alkyl aralkylamino groups such as N-methyl benzylamino, N-ethyl p-chlorobenzylamino, N-ethyl phenethylamino, N-methyl homoveratrylamino, and the like; and N-lower-alkyl anilino groups such as N-methyl anilino, N-ethyl o-chloranilino, N-methyl p-anisidino, and the like. In general, the aryl groups present in the aralkylamino group or in the anilino groups are the same and bear the same substituents as those set forth for R in the above formula when it represents a phenyl or substituted phenyl group.

The lactams provided by this invention are prepared by reacting phenyl isocyanate or a substituted-phenyl isocyanate with an enamine prepared by reaction of a secondary amine, AmH, with an α,α-dialkyl substituted acetaldehyde, as for example, isobutyraldehyde, α-methyl-n-butyraldehyde, α-ethyl-n-butyraldehyde, cyclopentylaldehyde, cyclohexylaldehyde, and the like. The reaction is carried out by simply mixing together equimolar quantities of the reactants, heating the mixture until a reaction is initiated, and then stirring at a temperature above about 10° C. and below the decomposition temperature of either the product or the reactants until the reaction has gone to completion. I prefer to carry out the reaction at a temperature in the range of 20–100° C. The reaction temperature employed will, of course, depend upon the reactivity of both the isocyanate and enamine reactants. For example, enamines in which the nitrogen carries an aryl substituent require far higher temperatures for reaction with an aryl isocyanate in a comparable length of time than do those in which both substituents on the enamine nitrogen are alkyl. In the latter case, the reaction starts spontaneously on mixing the ingredients, and external cooling is usually necessary to maintain the temperature within the preferred range. On the other hand, in the first instance when the enamine nitrogen is substituted with an aryl group, it is usually necessary both to heat the reaction mixture to above 50° C. to initiate the reaction and to continue heating at a temperature in the range of 50–100° C. in order to obtain completion of the reaction in a reasonable length of time. The course of the reaction is readily followed by infra-red analysis of probes taken from the reaction mixture at intervals, with the disappearance of the isocyanate band and the concomitant emergence of the lactam band being taken as the criterion for degree of completion of the reaction.

The lactams provided by this invention are surprisingly stable. Those in which $R_1$ in the above formula represents an alkyl group are stable indefinitely at ambient room temperature in the absence of moisture and those in which $R_1$ is aryl are stable even in the presence of moisture for short periods of time at temperatures as high as 40° C. or even higher. The compounds cannot be distilled, however, as they tend to decompose on heating to their boiling point, even in vacuo, nor do they form salts or other derivatives which could be recrystallized or otherwise purified. This very instability, however, signifies a high degree of reactivity and enables the lactams of this invention to undergo a large number of reactions to form a wide variety of useful products. Thus, the compounds of this invention find their chief use as intermediates in the preparation of other chemical compounds. For example, the compounds react with water, those in which $R_1$ is alkyl reacting at temperatures of 0–25° C., and those in which $R_1$ is aryl, at temperatures in the range 40–80° C. As would be expected when lower temperatures are used, the reaction time necessary to achieve complete hydrolysis is greatly prolonged, and the ranges given above are those which are preferred for practical reasons. It should be apparent to those skilled in the art, however, that temperatures below the preferred ranges are fully operative insofar as the hydrolysis reaction itself is concerned. Likewise, higher temperatures can be employed and are fully operative to produce the desired product, but the reaction proceeds with such rapidity at temperatures in the upper end of the above temperature range, that no advantage is gained in employing higher temperatures. In its reaction with water, a lactam represented by the above formula eliminates the amine moiety as a secondary amine and yields, as a main product, an N-aryl α-formyl-α,α-dialkylacetamide which is a useful intermediate for further reactions, as in forming heterocyclic compounds.

While hydrolysis of the lactam ring of the 2-azetidinones of this invention yields a product which is analogous to that obtained in the reaction between phenyl isocyanate and n-butyraldehyde, hydrogenation of the lactam yields either a diamine or an amino amide by a reaction which is not analogous to any known in the prior art. This reaction, by which the lactams represented by the above formula are hydrogenated, forms a second aspect of this invention. The product of the hydrogenolysis reaction, i.e., a diamine or amino amide, depends upon the hydrogenation conditions. Low pressure hydrogenation, for example, over a catalyst of relatively low activity, such as a palladium catalyst, results in the splitting of the lactam ring to yield a β-amino amide of the following structure:

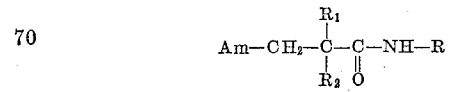

wherein Am, R, R₁, and R₂ have the same significance as hereinabove.

Use of a more powerful catalyst, and if necessary, more stringent reaction conditions such as a high temperature or pressure or alternatively use of a chemical reducing agent such as lithium aluminum hydride, yields a 1,3-diamine having the following structure:

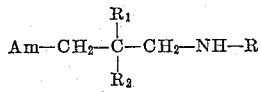

wherein Am, R, R₁, and R₂ have the same significance as hereinabove.

Both the catalytic hydrogenation and chemical reduction processes are carried out in the presence of an inert dispersant. In the catalytic reduction process, addition of a catalyst promoter to the hydrogenation mixture, as for example glacial acetic acid or gaseous HCl when a platinum oxide catalyst is being employed, greatly increases the activity of the catalyst and in general results in the reduction of the amide function as well as the splitting of the lactam ring. Similar use of higher pressures or temperatures or both with a very active catalyst in a catalytic hydrogenation also tends to yield a product in which the amide function is reduced. Apparently, the splitting of the lactam ring is the first step in a catalytic hydrogenation process and the second step, in which the amide function is reduced to an amine, either does or does not take place according to the reaction conditions employed. Hydrogenation conditions leading to reduction of the amide function are well known in the prior art as are conditions in which the amide function is not reduced. The chemical reduction employing lithium aluminum hydride or similar metal hydrides having hydrogenating activity is carried out under any of the various reaction conditions which have been described in the prior art.

Both the β-amino amides and 1,3-diamines produced by the hydrogenation of the 2-azetidinones of this invention are compounds of a type not readily available by other synthetic methods. The compounds prepared to date have an effect on the central nervous system of experimental animals, some being stimulants and others depressants, and some, like epinephrine, having both types of action.

This invention is further illustrated by the following specific examples:

*Example 1.—Preparation of 1-phenyl-3,3-dimethyl-4-dimethylamino-2-azetidinone*

Thirty-six and nine-tenths grams of phenyl isocyanate were added to 35.1 g. of 1-dimethylamino-2-methylpropene (the enamine from dimethylamine and isobutyraldehyde). After a short reduction period a spontaneous exothermic reaction occurred. The reaction mixture was then stirred in the range 30–50° C. with occasional cooling in an ice bath to maintain the temperature in that range. Stirring was continued until the reaction forming 1-phenyl-3,3-dimethyl-4-dimethylamino-2-azetidinone was completed as evidenced by examination of the infra-red spectrum of the product for disappearance of the isocyanate band at 4.4–4.5μ and the appearance of the lactam band at 5.7μ.

The compound was stable when maintained in a desiccator but rapidly hydrolyzed in the presence of water vapor to yield α-formly-α-methylpropionanilide. The nuclear magnetic resonance spectrum of 1-phenyl-3,3-dimethyl - 4-dimethylamino-2-azetidinone was compatible with the lactam structure.

*Example 2.—Preparation of α-formyl-α-methylpropionanilide*

Fifteen and six-tenths grams of 1-phenyl-3,3-dimethyl-4-dimethylamino-2-azetidinone were dissolved in ether. Water was added to the ethereal solution and the resulting mixture was shaken. The odor of dimethylamine escaping from the reaction was quite noticeable. The ethereal solution was washed successively with three 50-ml. portions of 1 N hydrochloric acid, two 50-ml. portions of 1 N sodium hydroxide, three 50-ml. portions of water, and one 50-ml. portion of a saturated sodium chloride solution. The ethereal solution was separated and dried and the ether removed by evaporation in vacuo, leaving as a residue α-formyl-α-methylpropionanilide. Recrystallization of the residue from an ether-hexane mixture yielded α-formyl-α-methylpropionanilide melting at about 55–58° C. *Analysis.*—Calc.: N, 7.32. Found: N, 7.18.

*Example 3.—Preparation of 1-phenyl-3,3-dimethyl-4-(N-methylanilino)-2-azetidinone*

Following the procedure of Example 1, 19 g. of phenyl isocyanate were mixed with 27 g. of 1-(N-methylanilino)-2-methyl-1-propene (the enamine from isobutyraldehyde and N-methylaniline). The reaction mixture was heated at 80–90° C. for four hours. Half the reaction mixture was diluted with an equal volume of water and the aqueous mixture was extracted with three 100-ml. portions of ether. The ether extracts were combined, were washed successively with 1 N hydrochloric acid, I N sodium hydroxide, and water. The ether solution was dried and the ether removed by evaporation in vacuo, leaving as a residue a yellowish solid comprising 1-phenyl-3,3-dimethyl-4-(N-methylanilino)-2-azetidinone. Repeated recrystallizations of the solid from an ether-hexane solvent mixture yielded 1-phenyl-3,3-dimethyl-4-(N-methylanilino)-2-azetidinone melting at about 112–114° C. *Analysis.*—Calc.: C, 77.11; H, 7.19; N, 9.99. Found: C, 77.81; H, 7.33; N, 10.11. The infrared spectrum and nuclear magnetic resonance spectrum of the product were compatible with a stable lactam structure. The ultraviolet spectrum of the product had the following absorption maximum:

$$\lambda^{248\ m\mu}_{max.} = 28{,}000$$

*Example 4.—Preparation of β-dimethylamino-α,α-dimethylacetanilide*

Thirty-six grams of 1-phenyl-3,3-dimethyl-4-dimethylamino-2-azetidinone were dissolved in anhydrous benzene and the solution was hydrogenated over a palladium catalyst in a low-pressure hydrogenation apparatus. After the uptake of hyrogen had ceased, the catalyst was removed by filtration, and the filtrate, containing β-dimethylaminomethyl-α,α-dimethylacetanilide formed in the above reaction, was heated in vacuo to remove the benzene solvent, leaving the β-aminoacetanilide compound as a residue. The residue was dissolved in ether, and gaseous hydrogen chloride was passed into the ether solution, thus forming β-dimethylaminomethyl-α,α-dimethylacetanilide hydrochloride, which melted at about 215–217° C. *Analysis.*—Calc.: C, 60.89; H, 8.42; N, 10.91. Found: C, 60.80; H, 8.24; N, 10.88.

*Example 5.—Preparation of 3-anilino-2,2-dimethyl-1-dimethylaminopropane*

One and nine-tenths grams of lithium aluminum hydride were suspended in ether. Five grams of 1-phenyl-3,3-dimethyl-4-dimethylamino-2-azetidinone in ether solution were added to the lithium aluminum hydride dispersion. The resulting mixture was stirred for about 16 hours. Next, 10 ml. of water were added to the reaction mixture to decompose the excess lithium aluminum hydride and any organo-metallic compounds present. The inorganic salts thus formed were separated by filtration. The filtrate was concentrated in vacuo, leaving as a residue 3-anilino-2,2-dimethyl-1-dimethylaminopropane formed in the above reaction. An excess of oxalic acid was added to the residue and the oxalate salt of 3-anilino-2,2-dimethyl-1-dimethylaminopropane thus formed was crystallized from ethyl acetate. The oxalate sale melted at about 104–107° C. after a 4-fold recrystallization from an acetone-ethyl acetate solvent mixture. *Analysis.*—Calc.: C, 60.79; H, 8.16. Found: C, 60.76; H, 8.11.

I claim:
1. A compound of the formula

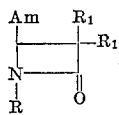

wherein Am is a member of the group consisting of di-(lower-alkyl)amino, N-lower alkyl anilino, N-lower alkyl substituted-anilino wherein said substituents are members of the group consisting of lower alkyl, halo, lower alkoxy, nitro, and trifluoromethyl, N-lower alkyl phenyl-lower-alkylamino, piperidino, pyrrolidino, and morpholino, R is a member of the group consisting of phenyl and substituted phenyl wherein said substituents are members of the group consisting of lower alkyl, halo, lower alkoxy, nitro, and trifluoromethyl, and $R_1$ and $R_2$, when taken separately, represent lower alkyl groups and, when taken together with the carbon atom to which they are attached, represent a cycloalkyl group having from five to eight carbon atoms.

2. 1-phenyl - 3, 3 - dimethyl-4-dimethylamino-2-azetidinone.

3. 1-phenyl-3,3-dimethyl-4-(N-methylanilino)-2-azetidinone.

References Cited by the Examiner
UNITED STATES PATENTS

| | | | |
|---|---|---|---|
| 2,851,494 | 9/58 | Ehrhart et al. | 260—562 |
| 2,912,460 | 11/59 | Ehrhart et al. | 260—562 |
| 3,076,800 | 2/63 | Graf | 260—239 |
| 3,098,067 | 7/63 | Testa | 260—239 |

OTHER REFERENCES

Blicke et al., J. Org. Chem., vol. 23, pages 1102–1107 (1958).

NICHOLAS S. RIZZO, *Primary Examiner.*